United States Patent
Wang et al.

(10) Patent No.: US 11,387,926 B2
(45) Date of Patent: Jul. 12, 2022

(54) EFFICIENT TRANSFER OF SENSOR DATA ON DYNAMIC SOFTWARE DEFINED NETWORK (SDN) CONTROLLED OPTICAL NETWORK

(71) Applicant: NEC Laboratories America, Inc., Princeton, NJ (US)

(72) Inventors: Ting Wang, West Windsor, NJ (US); Junqiang Hu, Davis, CA (US); Shailendra Gaikwad, Princeton, NJ (US)

(73) Assignee: NEC Corporation

( * ) Notice: Subject to any disclaimer, the term of this patent is extended or adjusted under 35 U.S.C. 154(b) by 74 days.

(21) Appl. No.: 17/079,420

(22) Filed: Oct. 24, 2020

(65) Prior Publication Data
US 2021/0123798 A1    Apr. 29, 2021

Related U.S. Application Data

(60) Provisional application No. 62/925,784, filed on Oct. 25, 2019.

(51) Int. Cl.
*H04Q 11/00* (2006.01)
*H04J 3/06* (2006.01)
*G01D 5/353* (2006.01)
*H04L 45/121* (2022.01)
*H04L 45/00* (2022.01)
*H04J 3/00* (2006.01)

(52) U.S. Cl.
CPC ........ *H04J 3/0682* (2013.01); *G01D 5/35383* (2013.01); *H04J 3/00* (2013.01); *H04L 45/00* (2013.01); *H04L 45/121* (2013.01)

(58) Field of Classification Search
CPC ....................................................... H04L 45/00
See application file for complete search history.

(56) References Cited

U.S. PATENT DOCUMENTS

| | | | |
|---|---|---|---|
| 2016/0234333 A1* | 8/2016 | Yeh | H04L 47/27 |
| 2018/0241679 A1* | 8/2018 | Muscariello | H04L 43/0864 |
| 2020/0007228 A1* | 1/2020 | Hu | G01D 5/35364 |

* cited by examiner

*Primary Examiner* — Shi K Li
(74) *Attorney, Agent, or Firm* — Joseph Kolodka

(57) ABSTRACT

Aspects of the present disclosure describe a computer implemented method for the transfer of sensor data on dynamic software defined network (SDN) controlled optical network.

2 Claims, 4 Drawing Sheets

EFFICIENT TRANSFER OF SENSOR DATA ON DYNAMIC SOFTWARE DEFINED NETWORK (SDN) CONTROLLED OPTICAL NETWORK

CROSS REFERENCE

This disclosure claims the benefit of U.S. Provisional Patent Application Ser. No. 62/925,784 filed Oct. 25, 2019 the entire contents of each incorporated by reference as if set forth at length herein.

TECHNICAL FIELD

This disclosure relates generally to distributed optical fiber sensing systems. More particularly, it pertains to the efficient transfer of sensor data on software defined network (SDN) controlled optical networks.

BACKGROUND

As is known, intrinsic optical fiber sensing—whereby the fiber optic cable itself is the sensor—has found widespread applicability due to its ability to measure numerous parameters along the length of the fiber optic cable such as strain, stress, vibration, and temperature—among others. Also known, the emerging Software Defined Networking (SDN) paradigm separates a data plane from a control plane and centralizes network control in an SDN controller. SDN facilitates the virtualization of network functions such that multiple virtual networks may operate over a given installed physical network infrastructure. As a result, the SDN paradigm holds great promise—particularly in optical networks—as software defined optical networks (SDON).

SUMMARY

An advance in the art is made according to aspects of the present disclosure directed to the transfer of distributed optical fiber sensor data over a software defined network managed optical network.

Accordingly, the present disclosure describes a computer implemented method for controlling and collecting distributed optical fiber sensing as part of a Software Defined Network (SDN) optical network managed by an Optical Network Operating System (ONOS), the method providing the SDN optical network managed by an ONOS, said network including one or more distributed optical fiber sensing systems each including an interrogator and one or more individual sensors; initiating, by an interrogator source, a request for initiating sensor data transfer d; receiving, by a destination j, the request for sensor data transfer d; determining, from an ONOS database, multiple network paths between the interrogator source and destination j; determining a size of sensor data chunks and number of copies of the sensor data chunks to transfer from the interrogator source to the destination j; determining, for the interrogator source, a transmission delay and a path utility; and forwarding the sensor data chunk if the determined path utility is greater than a predetermined threshold and the transmission delay is less than a predetermined delay.

In sharp contrast to the prior art and viewed from a first aspect—our inventive methods advantageously leverages the operational benefits of an SDN optical network and the significant sensing capabilities of distributed optical fiber sensing.

BRIEF DESCRIPTION OF THE DRAWING

A more complete understanding of the present disclosure may be realized by reference to the accompanying drawing in which.

Figure 1:
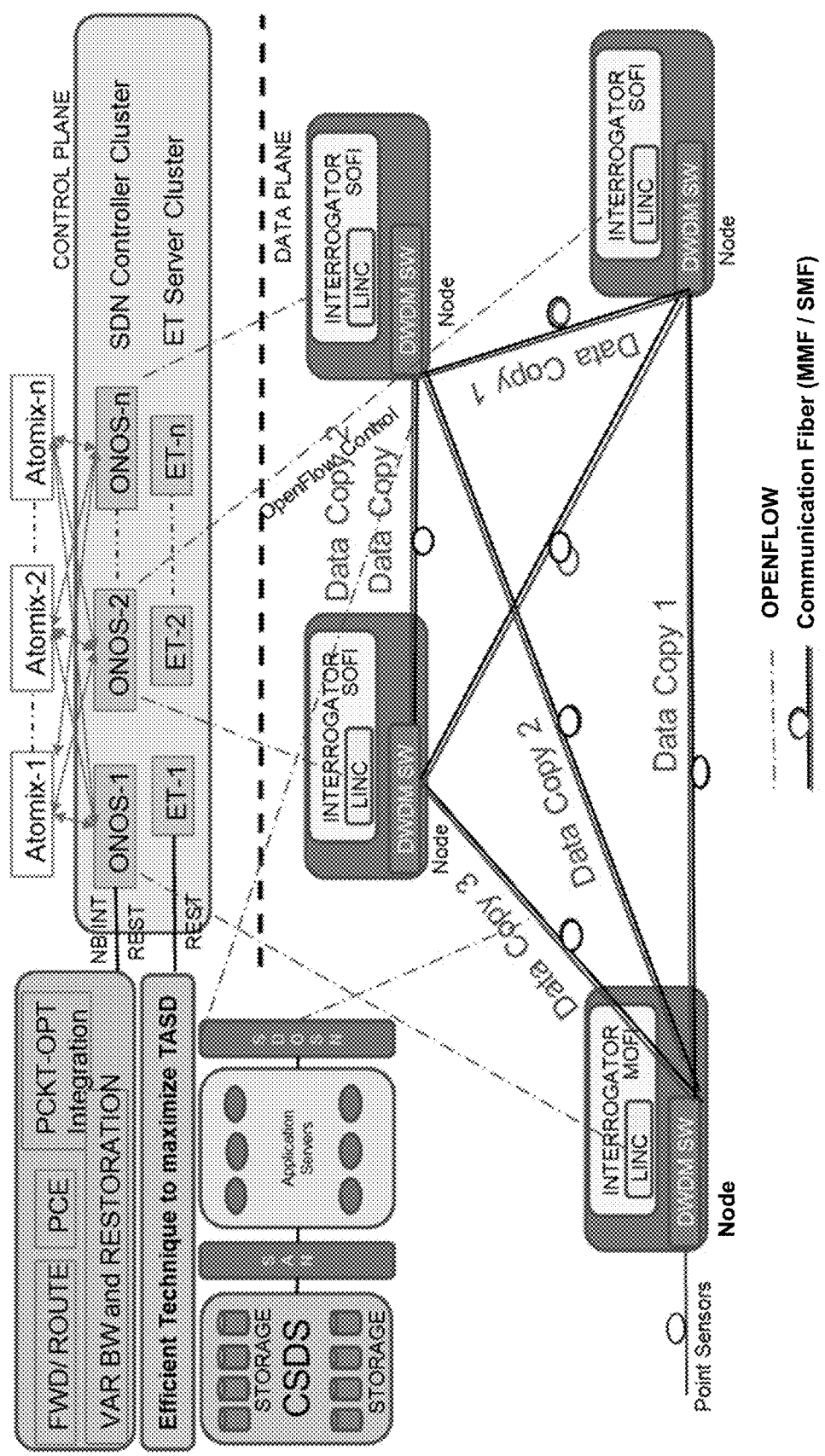
FIG. 1 is a schematic diagram of an illustrative SDN including DFOS overlay (Software Defined Optical Sensor Network—SDOSN) having multiple interrogators and a centralized storage system for sensor data according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that—at its core—SDN is a networking philosophy providing the separation of a control plane from a data plane (or forwarding plane) in traditional network elements (i.e., switches, routers, etc) where the control plane provides intelligent logic that controls how data traffic is managed and handled and the data plane is the forwarding plane that manages forwarding/manipulating/dropping/etc of network data traffic. This separation of the control from the forwarding allows for more sophisticated traffic management than is possible using legacy, access control lists (ACLs) and routing protocols. Additionally, OpenFlow allows switches from different vendors—often each with their own proprietary interfaces and programming languages—to be managed remotely using a single, open protocol.

As we shall show and describe according to aspects of the present disclosure, the SDN unified control plane benefits can be extended to large-scale unified packet and optical transport network(s) having OpenFlow (OF) extensions and controller clustering to ensure compatibility and end-to-end delay guarantees.

Those skilled in the art will know and understand that OpenFlow is a communications protocol that provides access to the forwarding plane of a network switch or router on the network. OpenFlow enables network controllers to determine path(s) of network packets across a network of switches. The controllers are distinct from the switches.

OpenFlow allows remote administration of a layer 3 switch's packet forwarding tables, by adding, modifying and removing packet matching rules and actions. This way, routing decisions can be made periodically or ad hoc by the controller and translated into rules and actions with a configurable lifespan, which are then deployed to a switch's flow table, leaving the actual forwarding of matched packets to the switch at wire speed for the duration of those rules. Packets which are unmatched by the switch can be forwarded to the controller. The controller can then decide to modify existing flow table rules on one or more switches or to deploy new rules, to prevent a structural flow of traffic between switch and controller. It could even decide to forward the traffic itself, provided that it has told the switch to forward entire packets instead of just their header.

Those skilled in the art will understand and appreciate that SDN and Machine Learning/Artificial Intelligence (AI) may be combined to: collect sensor data, and estimate locations of impact events; enable prediction of network traffic, increase/decrease number of sensors, time of data measurement.

FIG. 1 is a schematic block diagram of an illustrative employs a software layer, it provides a holistic view of the network that one can configured/monitor/troubleshoot network devices from a central point advantages such as reduced manual efforts, dynamic scalability, and central management of network devices. To understand etter, consider the following: In traditional networks, each network device in enterpricse traditional optical networks experienced difficulties meeting current networking requirements like dynamic scalability, central control and management, on the fly changes or experiments, lesser error-prone manual configurations on each networking node, handling of network traffic (which has massively increased due to boom of mobile data), and server virtualization traffic in data centers.

As is known in the optical sensing and communications arts, distributed optical fiber sensing involves several related technologies in which an interrogator—generally located within a station—actively generates optical signals, introduces them into an optical fiber, and subsequently detects reflected signals originating along a length of the fiber. Such reflections may originate—for example—as a result of changing environmental conditions that the fiber and/or sensors positioned along its length experience. As such, the optical fiber conveys—via reflected signal(s)—environmental/sensory data back to the interrogator where—using signal processing techniques—the interrogator determines/derives valuable information about environmental conditions along the length of the fiber.

As currently implemented, distributed fiber optic sensing (DFOS or DFS) based on Brillouin scattering or Raman scattering have exhibited a wide range of potential industrial applications in strategic applications such as infrastructure monitoring, intrusion detection, and environmental monitoring—including earthquake detection—among others. Discrete (Fabry-Perot) sensors advantageously provide high sensitivity, dynamic range, and response speed for measurement of temperature, strain, pressure, displacement, and magnetic field.

FIG. 1 is a schematic diagram of an illustrative SDN including DFOS overlay (Software Defined Optical Sensor Network—SDOSN) configuration having multiple interrogators and a centralized storage system for sensor data according to aspects of the present disclosure.

As illustrated in that figure, a master optical fiber interrogator (MOFI) collects sensor data and transfers it to the common data storage (DSDS) located across the packet and optical transport network—which in this illustrative schematic—is shown as a mesh network managed centrally by SDN controller (Optical Network Operating System) ONOS. Of particular interest to our inventive concepts and disclosure, is our efficient technique (ET) server cluster which advantageously maximizes the total amount of sensor data (TASD) conveyed across the network.

To evaluate our inventive concepts, we model our optical network element as a SDOSN graph with multiple paths between source $(n_1, n_2, \ldots n_5)$ and destination data storage (CSDS). Such graph is shown schematically in FIG. 2 and is representative of our inventive overlay network architecture.

Operationally, all available upload bandwidth (BW) from all optical links directly connected to MOFI are used to transfer sensor data via multiple paths to the CSDS. Quality of Service (QoS) aspects such as priority assigned to sensor data, bit rate, network latency, and throughput are considered to estimate the copies of scalable sensor data chunks of a total amount of sensor data (TASD) that is conveyed across the network from interrogator to the CSDS.

As noted above, our model graph exhibits an overlay network architecture wherein each node can be a source (if first hop from MOFI), a destination (if CSDS), and a relay or helper. Our ET (as a network control application of the ONOS) uses source routing after Dijkstra's algorithm by ONOS to dynamically identify network paths to the destination node, CSDS. Network control applications separate from ONOS pre-collect all node and link information for the ET. As will be appreciated, the time to identify such paths is faster than prior methods since all such information exists in the ONOS database, however, instead of selecting one best path for sensor data transfer multiple paths are used.

Figure 2:
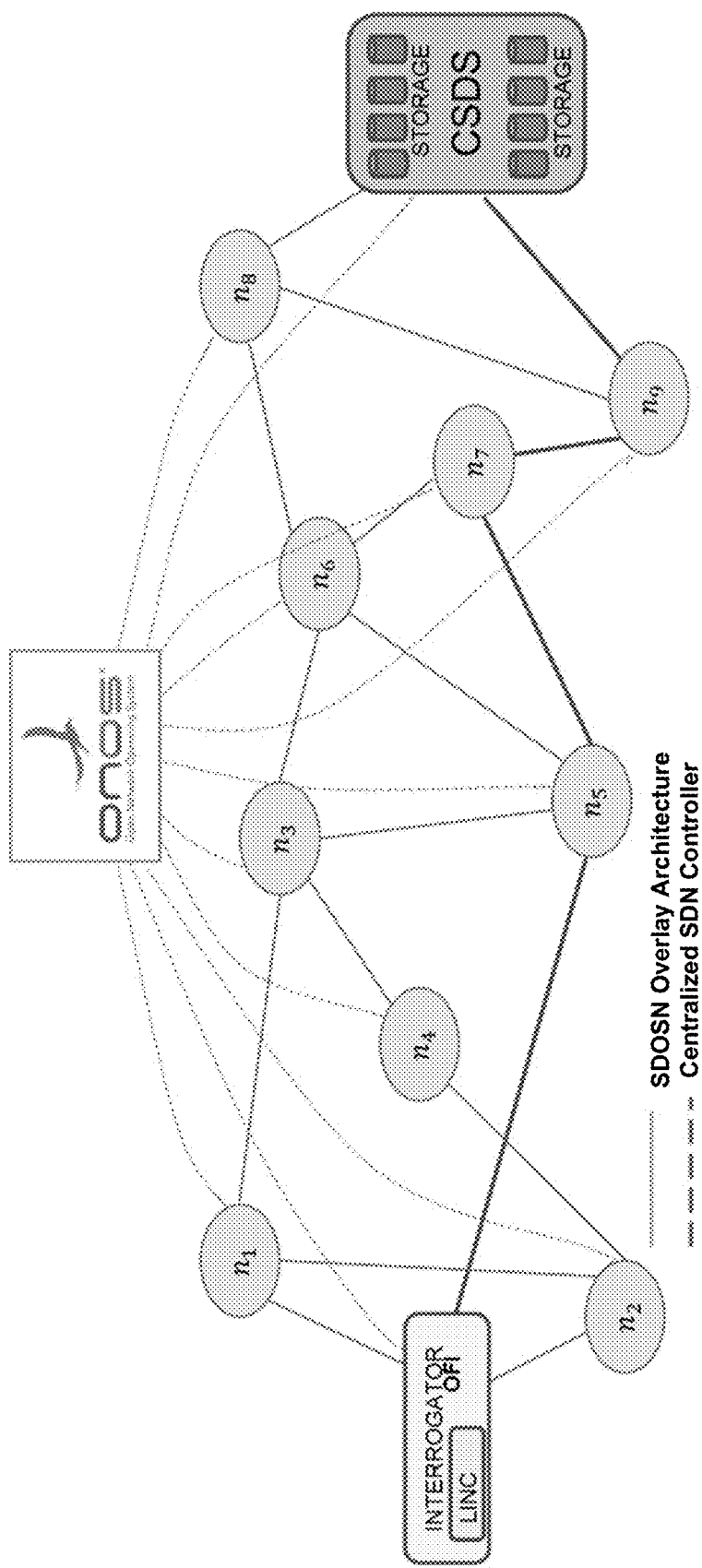
FIG. 2 is a schematic diagram of a SDOSN graph with multiple paths between source ($n_1, n_2, \ldots n_5$) and destination data storage (CSDS) according to aspects of the present disclosure.

With continued reference to FIG. 2 wherein an interrogator is shown that needs to send sensor data to the CSDS. As will be appreciated and understood, if only a single path from the interrogator to the CSDS is available/used, such single path's bandwidth may not be sufficient if the sensor data that needs to be transferred changes dynamically. Such single path may result in the loss/drop/retransmission of sensor data due to congestion, link failure, or reroute timing.

We note again that our ET algorithm exists as a separate network application along with ONOS that advantageously makes use of multiple paths that exist between a source and a destination. Operationally, it sends multiple copies of sensor data on these multiple paths resulting in better TASD between the source and the destination under conditions of dynamic network change, and varying amounts of sensor data in transit at any given instant. In fulfillment of such, our ET algorithm considers: an upload rate of each sender; maximum transmission capacity across a link; sending and receiving rate(s) of intermediate nodes; upload and forwarding capacity constraints with link forwarding compensation vector at time "t"; and an overall utility of a particular path.

In this manner, we achieve significant improvements in the transfer of sensor data on a dynamically changing SDN controlled optical network.

To evaluate our approach we necessarily describe the problem we now solve. More specifically, D denotes a sensor data chunk that is being scalable OFSI transferred into n number of copies such that $(C=\{c_1, c_2 \ldots c_n\})$ where $c_1$ represents the original data and $c_2 \ldots c_n$ represent the multiple copies of such data.

The rate at which each copy is transferred is represented using a data rate transfer vector such that $$r_{v_c} = \{r_{v_{c_1}}, r_{v_{c_2}} \ldots r_{v_{c_n}}\}.$$

If there are total of x nodes in the network as represented in a set N such that $N=\{n_1, n_2 \ldots n_x\}$. In order to maximize the TASD, n number of copies of original sensor data are transferred. If data chunk is received at the rate equal to $$S_{r_{v_c}},$$

then the SDOSN is receiving the maximum TASD.

The upload rate of each sender node should not exceed the maximum transmission capacity $B_{i,j}(t)$ available across a link at time t as given by:

$$u_{i,j}(t) \le B_{i,j}(t).$$

The complete set of variables employed in our problem description is shown in Table 1.

TABLE 1

| Variable | Description |
| --- | --- |
| D | Scalable OFSI data to transfer across SDOSN |
| C | n copies of the data chunk (C = $\{c_1, c_2 \ldots c_n\}$) |
| $r_{v_c}$ | Rate at which each copy c is transferred |
| $S_{r_c}$ | Total source rate in bps |
| X | Total number of nodes in the network |
| N | Set of x nodes in network N = $\{n_1, n_2 \ldots, n_x\}$ |
| M | q source nodes of data D, M = $\{m_1, m_2 \ldots m_q\}$ |
| $p_{i,j}$ | Connection between nodes l and j at time t |
| $u_{i,j}$ | Upload rate between node i and j at time t |
| $B_{i,j}(t)$ | Max transmission bandwidth capacity of link l and j at time t |
| $R_x(t)$ | Receiving rate for node x |
| $S_x(t)$ | Sending rate for node x |
| $F_{i,j}(t)$ | Total traffic flow from node i and j at time t |
| $\Theta_{ij}(t)$ | Link forwarding compensation vector at time t |
| $U_i$ | Utility of path i |
| $T_d$ | Transmission delay |
| $P_{d_i}$ | Propagation delay for node i |
| $L_{max}$ | Maximum time at destination node before which data chunk should arrive |

The upload rate of each sender node should not exceed the maximum transmission capacity $B_{i,j}(t)$ available across a link at time t as given by:

$$u_{i,j}(t) \le B_{i,j}(t).$$

If an intermediate node or a destination node k is receiving the sensor data packet from the source nodes present in a set M, the receiving rate for node k will be given by:

$$R_k(t) = \Sigma_{j \in M} p_{jk}(t) u_{jk}(t) \forall j \in M.$$

Similarly, if a node k is a helper or a relay node that forwards the sensor data packet to another network node until it reaches the destination node the total sending rate for node k is calculated as:

$$S_k(t) = \Sigma_{j \in N} p_{kj}(t) u_{kj}(t) \forall j \in N-M.$$

The upload rate constraint states that the sum of all the allocated upload rates to handle different data transfer requests should be less than or equal to the maximum upload rate for a node at t defined by:

$$\Sigma_{j \in N} p_{ij}(t)(u_{ij}(t) + F_{ij}(t)) \le U_i(t) \forall i \in M$$

If the node is a source then each outgoing link from the source node should not carry a rate larger than the actual source rate at which the sensor data is scalable OFSI coded, $$u_{ij}(t) - R_i(t) \le \theta_{ij}(t), \text{ i.e. } u_{ij}(t) - \Sigma_{j \in N} p_{ji}(t) u_{ji}(t) \le \theta_{ij}(t), \forall c_{ij}(t) \in C$$

where $\theta_{ij}(t)$ is the link forwarding compensation vector and can be considered as follows:

$$\theta_{ij}(t) = \begin{cases} S_{r_{v_c}} & \text{if } i = 0, p_{ij}(t) \text{ is downlink of source node} \\ 0 & \text{otherwise} \end{cases}$$

We provide a linear optimization problem to study this resource allocation problem among SDOSN nodes as given in the following set of relationships:

$$\text{Max } \Sigma_{k=1}^n TASD_k R_k$$

subject to $u_{i,j}(t) \le B_{i,j}(t)$ $$\Sigma j \in N P_{ij}(t)(u_{ij}(t) + F_{ij}(t)) \le U_i(t) \forall i \in M$$

Min $u_{p_i}$ subject to $u_{p_i}(t) \ge r_{v_{cj}}$ $$u_{ij}(t) - \Sigma_{j \in n} p_{ji}(t) x_{ji}(t) \le \Theta_{ij}(t) \forall p_{ij}(t)$$

$$u_{ij}(t) \ge 0, r_{v_{c_i}} (1 \le j \le n)$$

We maximize the sensor data transfer by predicting the TASD over a specified period of time—a numerical value. We also aim to minimize required upload capacity at each node as given by Min $u_{p_i}$ (see above) through multiple sources.

We use a simple Source Routing protocol to discover all possible paths between sources to any destination and forward data based on the calculated utility each path i as:

$$U_i = \frac{avg(u_{i,j})}{B_{i,j}}.$$

We normalize the link capacity over a path and combine it as a utility to estimate how busy the links are over a path.

The controller assigns scalable OFS I data copies to different sources. In case, if a source node leaves a network due to network congestion, node/link failure, etc., the assigned copies to that source are delivered by another suitable source identified by controller.

Figure 3:
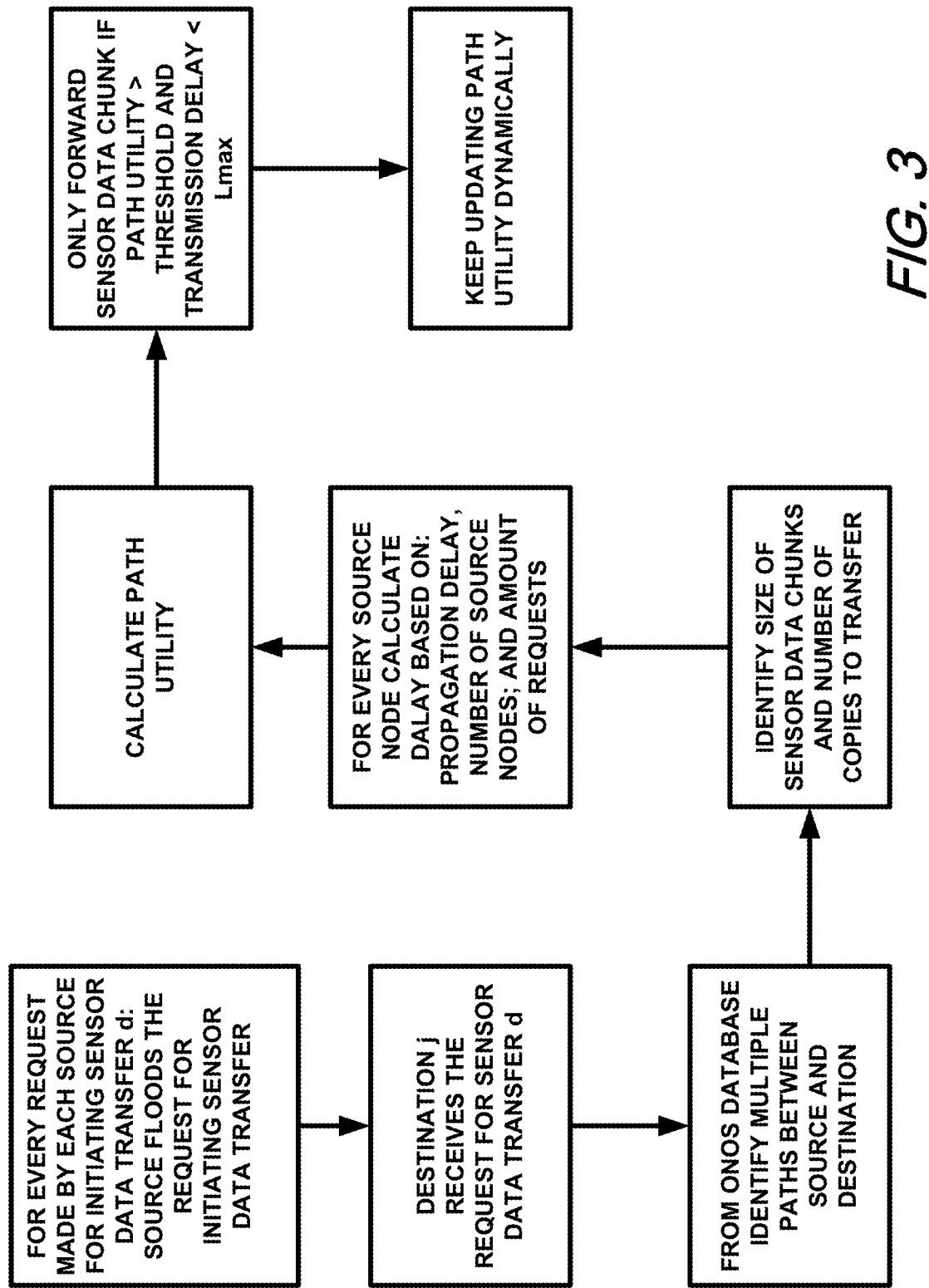
FIG. 3 is a block diagram illustrating our ET algorithm according to aspects of the present disclosure.

FIG. 3 is a block flow diagram illustrating our ET algorithm according to aspects of the present disclosure. As may be observed from that figure, our ET algorithm proceeds as follows. First, for every request made by each source for initiating sensor data transfer d: that source floods the request for initiating sensor data transfer. Next, destination j receives the request for sensor data transfer d. Using ONOS database, multiple paths between the source and destination are identified.

Next, the size of sensor data chunks and the number of copies to transfer are determined. For every source node, a delay is calculated based on: propagation delay, number of source nodes, and amount of requests flooded, and a path utility is calculated. If the path utility is >a threshold, and a transmission is less than Lmax, then—and only then—the sensor data chunk is forwarded. The technique continues updating path utility dynamically.

As may be readily appreciated by those skilled in the art, our ET algorithm uses multiple sources to transfer the scalable OFSI data coded copies towards any destination. In an input section of the algorithm, every node finds the all the possible paths towards any other node based on a DSR protocol, and updates it to the centralized SDN controller ONOS, located at different locations in the network, wherein ONOS also collects the information about the available sensor data chunk sources. Furthermore, the network initializes the upload capacity, and maximum data arrival latency of sensor data for each node.

The Algorithm generally includes the following steps, as listed below to complete sensor data delivery to CSDS across the packet/optical transport network.

---
Efficient Technique (ET) Algorithm
---
begin
  for every request made by $n_i$ for initiating sensor data transfer d do
    f ← FloodRequest(d) // Source floods the request for initiating sensor data
    transfer d
    $M_j$ ← ReceiveRequest(d) // Destination j receives the request for sensor data
    transfer d
      for every source node $M_j$ do
        $f_{ji}$ ← CalculateDelay($P_i$, $M_j$, f)

$$CalculatePathUtility\left(U_i = \frac{avg(u_{i,j})}{B_{i,j}}\right)$$

If (PathUtility > Threshold of ($U_p$)) then
          Send $c_i$ of $C_t$ to destination f
          Update ($U_p$) of $P_i$
          If $T_d > L_{max}$ then
            Discard $c_i$
      end for
end
---

Figure 4:
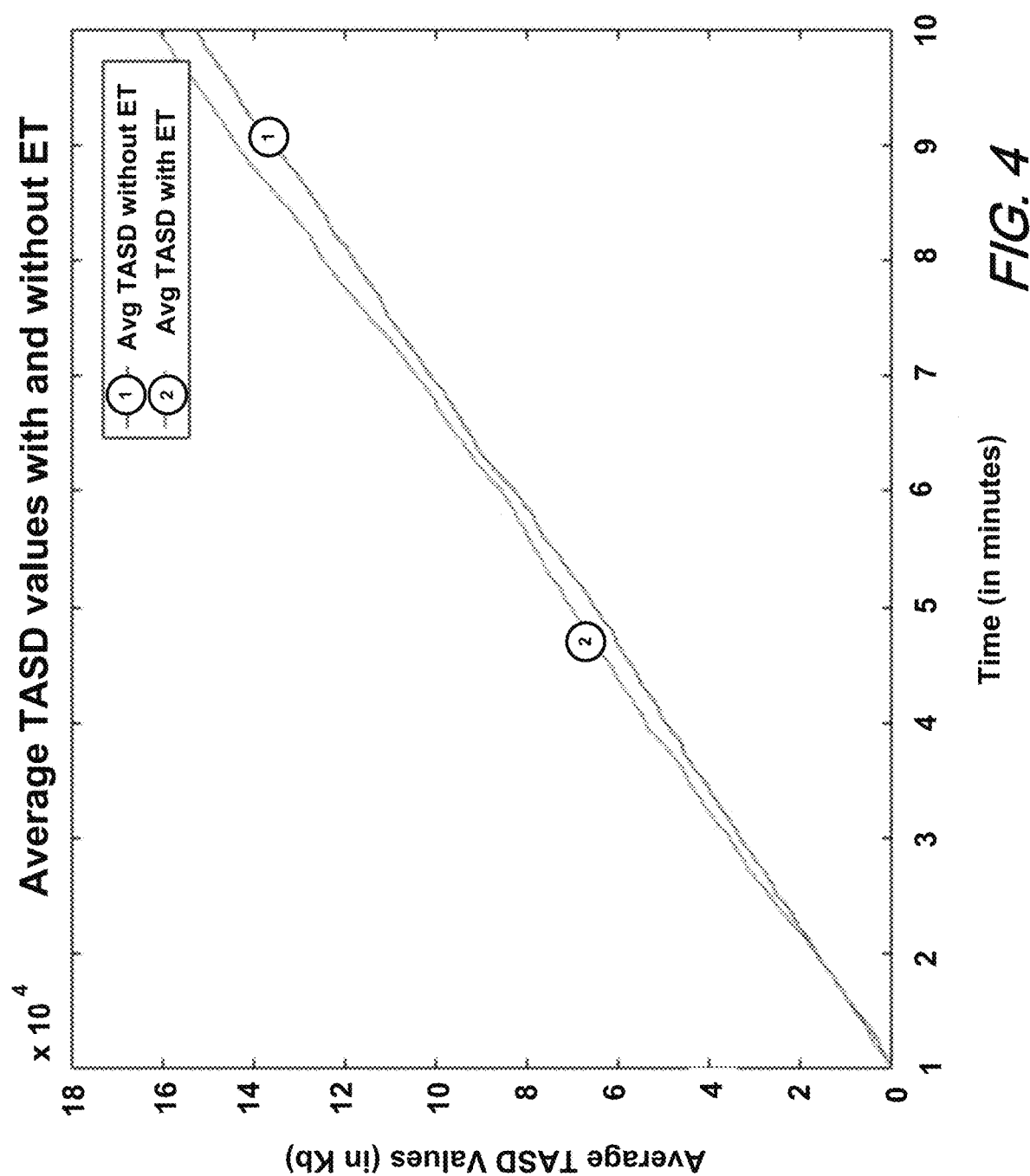
FIG. 4 is a plot showing average TASD values vs. Time for a simulation run with and without ET according to aspects of the present disclosure.

To evaluate/test our inventive methodology, we consider a network comprising on 50 nodes randomly located. The network is considered highly dynamic, which means that links between nodes change their bandwidth (BW) frequently. Hence, we obtained the results at different link capacities; 1 Mbps for congested link to 100 Gbps for unutilized fiber channel. The upload capacity of each node is set to be in between 1 Mbps to 10 Gbps and the maximum transmission range between the source and destination is set to 100 kms. This means that if the transmission range exceeds 100 kms, the node cannot be used for transferring sensor data. However, if the transmission range is below 100 kms, the node adjusts the link capacity within the range of 1 Mbps to 100 Gbps. A simulation of the above network uses DSR routing protocol and is run ten times each for ten minutes measuring TASD values for SDOSN with and without ET. Average TASD values are plotted in FIG. 4 and OFSI sensor data coding Copies=3.

As may be observed from that plot, average TASD values with ET are always better than without ET. For three OFSI data copies, ET efficiently utilizes the upload capacity at each node to give better TASD. Note that while link congestion appeared to be greater with ET, it is limited and advantageously does not saturate the link capacities.

From our modeling and simulation, we have determined that our inventive ET technique improves the TASD received at destination nodes by approximately 6% (5.7061%). In addition, dynamic link and node disconnections have little effect on TASD as ONOS dynamically handles such situations with modified Dijkstra's algorithm and global view. Finally, scaling of mesh network further necessitates scaling the cluster of SDN controllers appropriately to maintain response times of link discovery and fault tolerance.

While we have presented this disclosure using some specific examples, those skilled in the art will recognize that our teachings are not so limited. Those skilled in the art will understand and appreciate that SDN and Machine Learning/Artificial Intelligence (AI) may be combined to: collect sensor data, and estimate locations of impact events; enable prediction of network traffic, increase/decrease number of sensors, time of data measurement. Accordingly, this disclosure should be only limited by the scope of the claims attached hereto.

The invention claimed is:

1. A computer implemented method for controlling and collecting distributed optical fiber sensing as part of a Software Defined Network (SDN) optical network managed by an Optical Network Operating System (ONOS), the method comprising:
   providing the SDN optical network managed by an ONOS, said network including one or more distributed optical fiber sensing systems each including an interrogator and one or more individual sensors;
   initiating, by an interrogator source, a request for initiating sensor data transfer d;
   receiving, by a destination j, the request for sensor data transfer d;
   determining, from an ONOS database, multiple network paths between the interrogator source and destination j;
   determining a size of sensor data chunks and number of copies of the sensor data chunks to transfer from the interrogator source to the destination j;
   determining, for the interrogator source, a transmission delay and a path utility; and
   forwarding the sensor data chunk if the determined path utility is greater than a predetermined threshold and the transmission delay is less than a predetermined delay.

2. The method of claim 1 wherein the transmission delay is determined in consideration of propagation delay, number of source nodes, and number of requests.

* * * * *